(12) United States Patent
Buckley et al.

(10) Patent No.: US 9,396,225 B2
(45) Date of Patent: *Jul. 19, 2016

(54) SYSTEM AND METHOD FOR ADDRESSING A UNIQUE DEVICE FROM A COMMON ADDRESS BOOK

(71) Applicant: BlackBerry Limited, Waterloo (CA)

(72) Inventors: Adrian Buckley, Tracy, CA (US); Andrew Michael Allen, Hallandale Beach, FL (US); Youngae Kim, Hallandale Beach, FL (US); Jan Hendrik Lucas Bakker, Fort Worth, TX (US); Nicholas Patrick Alfano, Stratford-Upon-Avon (GB); Barry Linkert, Petersburg (CA); Gaëlle Christine Martin-Cocher, Toronto (CA); Suresh Chitturi, Plano, TX (US); Brian Edward Anthony McColgan, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/020,044

(22) Filed: Sep. 6, 2013

(65) Prior Publication Data

US 2014/0006460 A1    Jan. 2, 2014

Related U.S. Application Data

(63) Continuation of application No. 12/361,982, filed on Jan. 29, 2009, now Pat. No. 8,549,603.

(60) Provisional application No. 61/024,278, filed on Jan. 29, 2008.

(51) Int. Cl.
*H04L 29/06* (2006.01)
*G06F 17/30* (2006.01)
(Continued)

(52) U.S. Cl.
CPC .... *G06F 17/30342* (2013.01); *H04L 29/12047* (2013.01); *H04L 29/12594* (2013.01);
(Continued)

(58) Field of Classification Search
CPC ..... G06F 21/34; G06F 21/31; H04L 63/0853; G07F 7/1008; G06Q 20/341
USPC .............................................................. 726/9
See application file for complete search history.

(56) References Cited

U.S. PATENT DOCUMENTS

| 6,603,839 | B1 | 8/2003 | Smith, Jr. et al. |
| 7,068,768 | B2 * | 6/2006 | Barnes ............ H04M 1/274516 |
| | | | 379/142.15 |

(Continued)

FOREIGN PATENT DOCUMENTS

| WO | 2007079578 A1 | 7/2007 |
| WO | 2008001177 A2 | 1/2008 |

OTHER PUBLICATIONS

Open Mobile Alliance, "Convereged IP Messaging Requirements", Nov. 6, 2007, 1-71pages.*

(Continued)

*Primary Examiner* — Yonas Bayou

(74) *Attorney, Agent, or Firm* — Jon Gibbons; Fleit Gibbons Gutman Bongini & Bianco P.L.

(57) ABSTRACT

A method and system for addressing a unique device from an address book, the method having the steps of: receiving a message having a root token and a secondary token; checking whether the root token exists within the address book, if no, creating a record in the address book with the root and secondary token; and if yes, checking whether the secondary token exists within the address book, if yes, providing a representation of the unique device; and if no, storing the secondary token against the root token in the address book.

15 Claims, 12 Drawing Sheets

(51) Int. Cl.
   *H04L 29/12* (2006.01)
   *H04M 1/253* (2006.01)
   *H04M 1/2745* (2006.01)

(52) U.S. Cl.
   CPC .......... *H04L61/1594* (2013.01); *H04L 61/309* (2013.01); *H04M 1/2535* (2013.01); *H04M 1/2745* (2013.01); *H04L 65/1016* (2013.01)

(56) References Cited

U.S. PATENT DOCUMENTS

| | | | | |
|---|---|---|---|---|
| 7,760,712 | B2* | 7/2010 | Buckley | H04M 7/123 370/353 |
| 7,975,287 | B2* | 7/2011 | Hung | G06F 21/335 709/225 |
| 8,054,843 | B2* | 11/2011 | Huh | H04L 63/0407 370/395.2 |
| 8,090,830 | B2* | 1/2012 | Buckley et al. | 709/226 |
| 8,549,603 | B2 | 10/2013 | Buckley et al. | |
| 2003/0076934 | A1* | 4/2003 | Albal | H04M 1/2745 379/88.19 |
| 2004/0180646 | A1* | 9/2004 | Donley et al. | 455/411 |
| 2004/0268148 | A1* | 12/2004 | Karjala | H04L 41/0806 726/15 |
| 2006/0018272 | A1* | 1/2006 | Mutikainen | H04L 29/12009 370/328 |
| 2007/0002831 | A1* | 1/2007 | Allen | H04L 41/0846 370/352 |
| 2007/0156908 | A1* | 7/2007 | Szomolanyi | H04L 12/1822 709/227 |
| 2007/0223683 | A1 | 9/2007 | Pearson | |
| 2007/0238467 | A1* | 10/2007 | Buckley | H04Q 3/0045 455/445 |
| 2007/0282987 | A1 | 12/2007 | Fischer et al. | |
| 2008/0005263 | A1 | 1/2008 | Baraev et al. | |
| 2008/0064350 | A1* | 3/2008 | Winkler | H04M 3/42008 455/187.1 |
| 2009/0028179 | A1* | 1/2009 | Albal | G06Q 10/10 370/465 |
| 2009/0150488 | A1 | 6/2009 | Martin-Cocher et al. | |
| 2009/0177624 | A1* | 7/2009 | Ahlin | H04L 29/12132 |

OTHER PUBLICATIONS

"Converged IP Message Requirements, Candidates Version 1.0—Nov. 6, 2007".*

"Converged IP Message Requirements, Candidates Version 1.0—Nov. 6, 2007.".*

Ismail et al., "True Number Portability and Advanced Call Screening in a SIP-Based IP Telephony System" 1999, pp. 1-6.*

OMA (Open Mobile Alliance); "Converged IP Messaging Requirements, Candidate Version 1.0—Nov. 6, 2007"; Open Mobile Alliance, OMA-RD-CPM-V1_0-20071106-C; XP-002475847; 71 pages.

Mannekens, Jan; Authorized Officer; PCT Search Report and Written Opinion from related PCT/US2009/037760 dated Jun. 25, 2009; 17 pages.

Article 94(3) EPC dated Jan. 28, 2011 from related European Patent Application No. 09706842.3; 6 pages.

* cited by examiner

SYSTEM AND METHOD FOR ADDRESSING A UNIQUE DEVICE FROM A COMMON ADDRESS BOOK

RELATED APPLICATIONS

The present application is a continuation of U.S. application Ser. No. 12/361,982, filed Jan. 29, 2009, which claims the benefit of U.S. Provisional Application No. 61/024,278, filed Jan. 29, 2008, the contents of all of which are incorporated herein by reference.

FIELD OF THE DISCLOSURE

The present disclosure relates to address books and in particular to address books containing reachability information.

BACKGROUND

An address book on a device such as a wireless device usually consists of fields such as names, home address, office address, email address and public user identities such as telephone numbers, session initiation protocol uniform resource identifier (SIP URI), mobile systems international subscriber identity number (MSISDN), among others.

When a SIP user agent registers with a network, it is supposed to provide a global unique contact address. However, in practice this is nearly never achieved and as such, the functionality of a globally routable user agent URI (GRUU) was developed and is currently in an internet engineering task force draft that is going to a request for consultation.

GRUU provides a mechanism whereby a SIP user agent (UA) can provide a globally unique identifier. This is achieved by the UA providing its address of record that is appended by an instance identifier.

The instance identifier is an identifier that uniquely identifies the SIP UA and can, for example, be a medium access control (MAC) address, international mobile equipment identity (IMEI) among others. This allows SIP UAs to set up sessions to an address of record (AOR) at a specific device.

The concept of unique identification can also be achieved in non-SIP environments. For example, a user ID such as an email address coupled with a device ID can be used to determine the uniqueness of a particular device.

BRIEF DESCRIPTION OF THE DRAWINGS

The present disclosure will be better understood with reference to the drawings in which.

DETAILED DESCRIPTION

Figure 1:
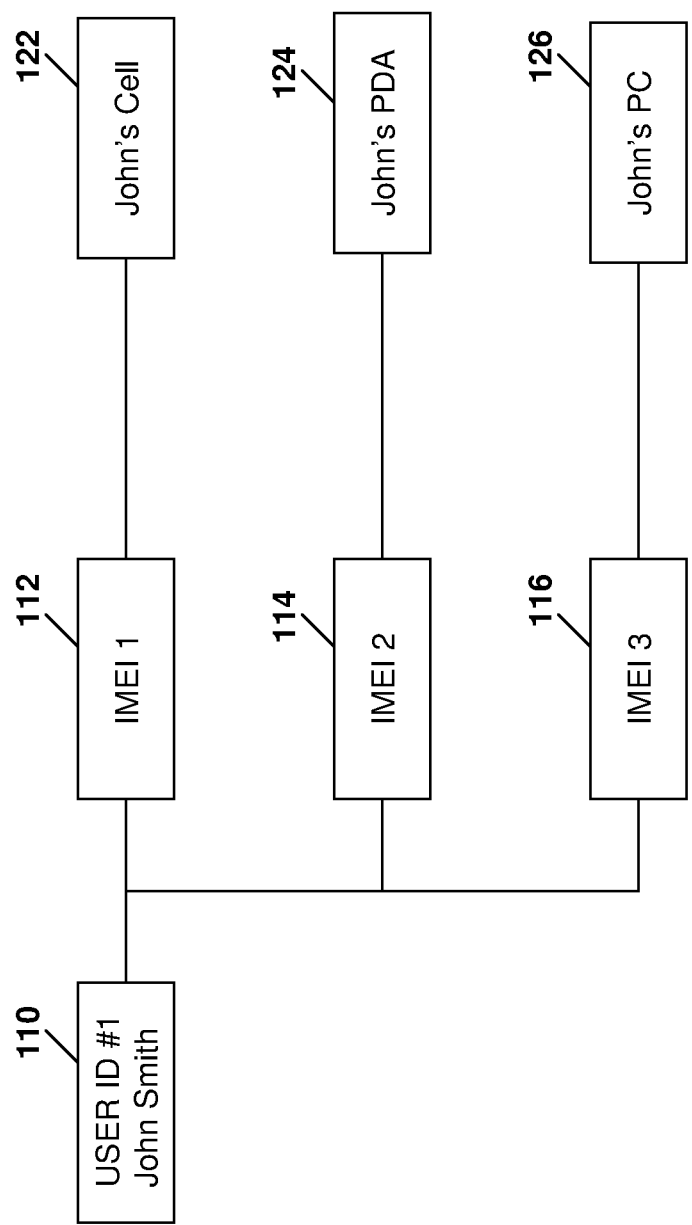
FIG. 1 is a block diagram of an exemplary data structure showing a one to many relationship between a user and devices.

The present disclosure provides a method for addressing a unique device from an address book comprising the steps of: receiving a message having a root token and a secondary token; checking whether the root token exists within the address book, if no, creating a record in the address book with the root and secondary token; and if yes, checking whether the secondary token exists within the address book, if yes, providing a representation of the unique device; and if no, storing the secondary token against the root token in said address book.

The present disclosure further provides a computing device adapted for addressing a unique device from an address book comprising: a communications subsystem adapted to receive a message having a root token and a secondary token; memory for storing the address book; and a processor, wherein the processor is adapted to check whether the root token exists within the address book, and if no, to create a record in the address book with the root and secondary token; and if yes, to check whether the secondary token exists within the address book, if yes, to provide a representation of the unique device; and if no, to store in the address book in the memory of the secondary token against the root token in said address book.

The present disclosure further provides a contact card for addressing a unique device comprising one or a plurality of an instance identifier field; a device identifier nickname field; device capabilities field; and a contact properties field, wherein the instance identifier field; or device identifier nickname field provide an address book with a relationship between a public user identity and a device.

The present disclosure relates to both SIP and non-SIP environments.

In one SIP specific embodiment, the present disclosure extends the concept of SIP UAs setting up sessions to an address of record of a specific device. In particular, a SIP UA can address the session to a specific SIP identity e.g. SIP URI, Tel URI etc., at a specific device. Users may have many devices and as such users may want to store uniquely identifiable device identifiers in their address books. The address book may be network based or can reside locally on the user's terminal.

In addition, the present disclosure provides for the setting up of a certain device in which the device being connected to has desired services that a user may wish to invoke. For example, if a sending party uses Yahoo™ messenger, it may be desirable that a recipient's device include Yahoo™ messenger or a video application among others. As will be appreciated, a user may wish to connect to a device that supports these features rather than to a device that does not.

In addition, the present disclosure provides for the setting up of a certain device in which the device being connected to has a desired contact property. For example, if a sending party wishes to contact one or more devices that belong to family, or one or more devices of user's in a professional context (e.g. 'office') or private context (e.g. 'home'), or based on the realm/operator service the receiving party's device (e.g. 'AT&T', 'Verizon') it may be desirable to include such contact properties when making modifications to the address book. The user may be prompted for such properties when modifications are made to the address book. As will be appreciated, a user may wish to connect to a device that satisfies these properties rather than to a device that does not.

A first problem therefore that is addressed by the present disclosure is that when user A, who wants to use certain properties of his device e.g. media, codecs that could correspond to an application, wishes to contact user B with some or all of the same properties, there is no way for user A to address user B at a specific device supporting application X. If user B can be reached on multiple devices the network is left to determine how to route the session unless RFC 3840 and 3841 have also been implemented which does provide some guidance. However, as will be appreciated by those skilled in the art, even if RFC 3840 and 3841 have been implemented, the implementation is network based and is still completely left up to the network how to route the session.

In addition, devices can also be shared among many users and sometimes user A may not be aware that both user B and user C share the same device to contact user A. This could occur, for example, in shared settings such as public personal computers in internet cafes or among shared mobile devices within a family, among others. As will be appreciated, various scenarios where two or more users can use the same device would be known to those skilled in the art.

In order to solve the above, outbound messages define an instance identifier (Instance_ID) whose property is unique across user agents (UAs). An Instance_ID is a uniform resource name and could be, but is not limited to, an IMEI, Medium Access Control (MAC) address, electronic serial number (ESN), personal identification number (PIN) among others. The outbound message has a message type, for example SIP, email, among others.

When a device receives a message of a certain message type (for e.g. SIP, non-SIP) that contains a public user identity or public contact view containing a public user identity (SIP URI, telephone URI (Tel URI), MSISDN, email address, among others) then the public user identity is to be stored where the Instance_ID is also stored.

A device, in one embodiment, includes an identifier. The device ID is an identifier that it has a property of uniqueness in a "message type" system being used and could even have uniqueness across message types. This uniqueness across message types could for example, be true for identifiers such as IMEI, among others.

In one embodiment, in order to facilitate ease of viewing for the Instance_ID, a device ID nickname is stored against the Instance_ID. As will be appreciated this allows ease of viewing for a user. Specifically, rather than a long number such as an IMEI associated with a particular device, the device could be nicknamed "Bob's Smart Phone", "Bob's Home Computer", "Bob's Cell Phone", among others. As will be appreciated, this list is not exhaustive and any type of device could receive a nickname. Further, a device ID nickname can be any identifier and is not limited to an alpha-numeric string. For example, the nickname could be a graphic, a sound, an alpha-numeric string, URL pointing to information to display/play, among others.

In the present disclosure, a relationship exists between a public user ID, Instance_ID and device ID nickname as follows:

Public user ID→Instance_ID→device ID nickname.

As will be appreciated, the relationship between the public user ID and Instance_ID can be a one to many, a many to one, or a many to many relationship.

A one to many relationship would be where a user has multiple devices. Reference is now made to FIG. 1. FIG. 1 shows a first user 110 who has three devices 112, 114 and 116 respectively.

Device 112 has IMEI number 1 and has a nickname 122 of "John's Cell" in the example of FIG. 1.

Device 114 has an IMEI number 2 and has a nickname 124 of "John's PDA" in the example of FIG. 1.

Device 116 has an IMEI number 3 and has a nickname 126 of "John's PC" in the example of FIG. 1.

FIG. 1 is merely meant as an example and is not meant to be limiting and in fact as identified earlier the IMEI could be replaced by MAC, PIN, ESN etc.

Figure 2:
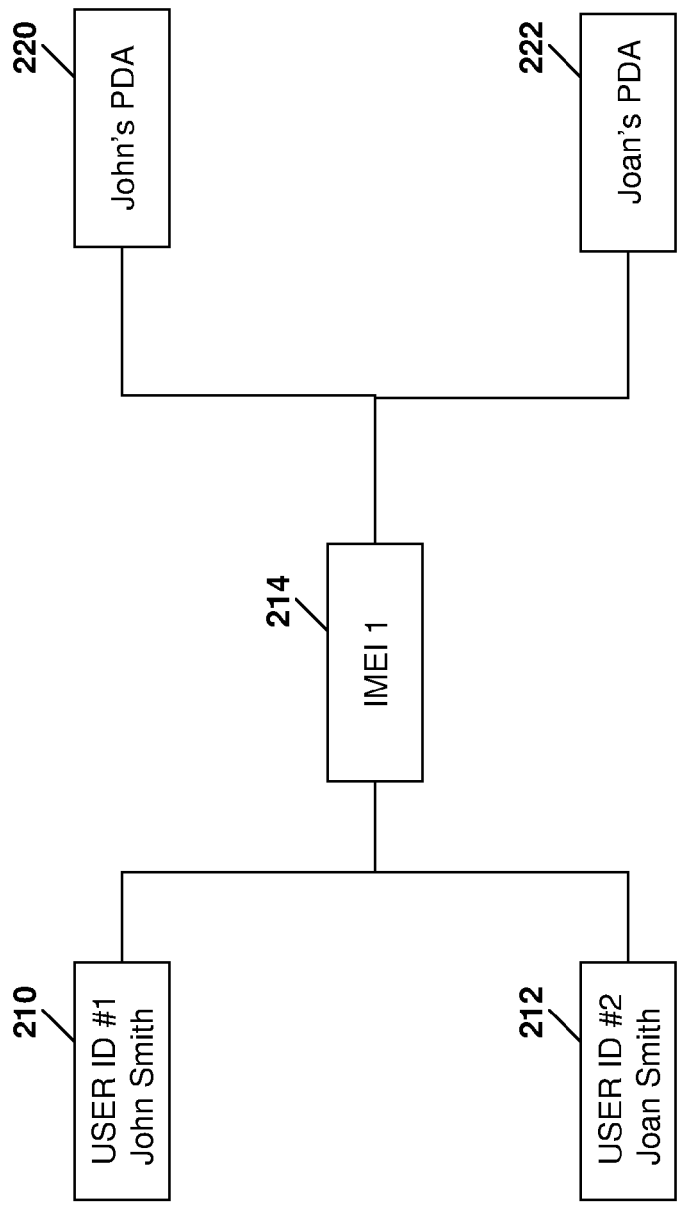
FIG. 2 is a block diagram of an exemplary data structure showing a many to one relationship between users and a device.

A many to one relationship can also exist. Reference is now made to FIG. 2. FIG. 2 shows a user 210 and a second user 212. Both users 210 and 212 share a device 214 having an IMEI number 1.

Since the users share device 214, two nicknames could be assigned to the device. In particular, nickname 220 and nickname 222 have been assigned to device 214.

Figure 3:
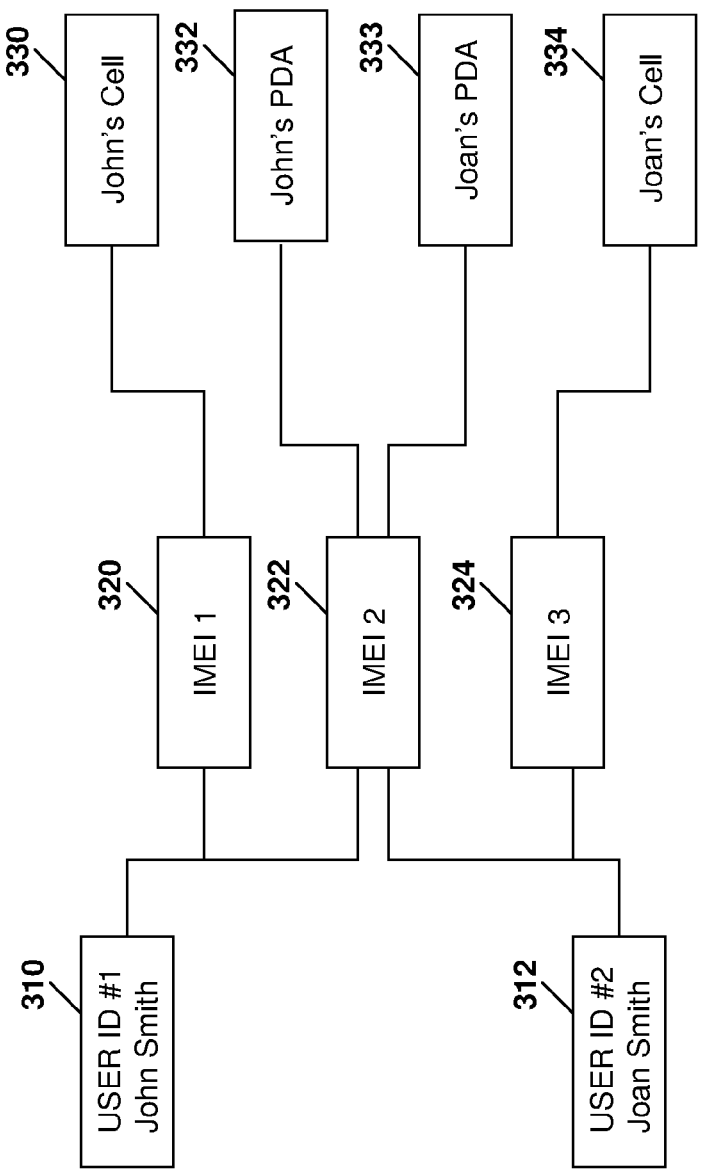
FIG. 3 is a block diagram of an exemplary data structure showing a many to many relationship between users and devices.

A many to many relationship can also exist. Reference is now made to FIG. 3. In FIG. 3 users 310 and 312 exist. User 310 has two devices associated with him and these are listed as IMEI 320 and 322. Further, the devices associated with user 310 have nicknames 330 and 332 and in the example of FIG. 3, these are "John's Cell" and "John's PDA".

User 312 further has a device 322 and a device 324 associated with her.

Device 322 has a nickname for user 312 of "Joan's PDA" 333 and a nickname for device 324 of "Joan's Cell" 334.

As will be appreciated by those skilled in the art, the examples of FIGS. 1 to 3 are merely illustrative and do not limit the number of users, number of devices or configuration of users and devices.

As indicated above, a device ID nickname is an identifier that is convenient to the user of a device storing the Instance_ID. The device identifier is either an alpha-numeric string, a graphic such as a picture, a sound, URL pointing to information to display/play, among others. The identifier is either stored locally or remotely.

The device ID nickname could be accessed by a pointer such as, but not limited to, a uniform resource locator (URL), file locator, among others, that identifies the location of the device ID nickname, removable memory card or remote server in the network. As will be appreciated, a removable memory card could take various forms, including but not limited to a Subscriber Identity Module (SIM) card, CompactFlash card, MicroSD card, memory stick, among others.

Figure 4:
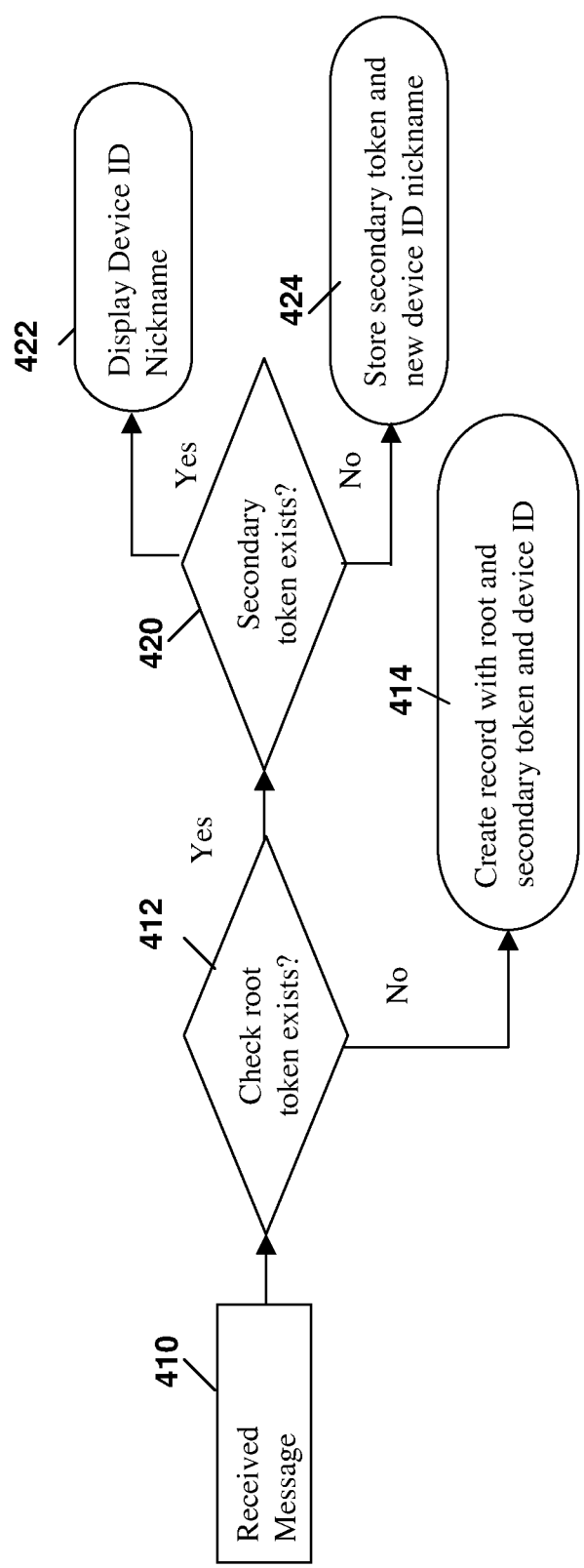
FIG. 4 is a flow diagram illustrating a generic method for linking a root token with a secondary token and for displaying a device ID nickname.

Reference is now made to FIG. 4. FIG. 4 illustrates a generic method to implement the above associations. Specifically, the method of FIG. 4 starts at block 410 in which a message having a message type is received. In one embodiment the message type is SIP, but in other embodiments other message types could be used, as provided in the description above.

The process then proceeds to block 412 in which a check is made to see whether a root token exists. As illustrated with reference to FIGS. 5 and 6 below, the root token could in one embodiment be a public user identifier or an Instance_ID. However, the root token is not limited to a public user identifier or Instance_ID, and other root tokens would be apparent to those skilled in the art.

If, in block 412, it is determined that a root token does not exist in the SIP message, the process proceeds to block 414 in which a record is created with a root and secondary token and a device identifier nickname.

Conversely, if, in block 412, it is determined that a root token does exist in the message received in block 410, the process proceeds to block 420 in which a check is made to see whether the SIP message received in block 410 contains a secondary token. From block 420, if a secondary token exists, the process proceeds to block 422 in which a device ID nickname is displayed for the device. As illustrated with reference to FIGS. 5 and 6 below, the secondary token could in one embodiment be a public user identifier or an Instance_ID. However, the secondary token is not limited to a public user identifier or Instance_ID, and other root tokens would be apparent to those skilled in the art.

Conversely, if a secondary token does not exist in block 420, the process proceeds to block 424 in which the secondary token is stored and a new device identifier is created. As will be appreciated by those skilled in the art, the creation of the device identifier can take various forms. For example, the user could be prompted to create a nickname. Conversely, a generic nickname could be assigned and edited by a user in the future.

Figure 5:
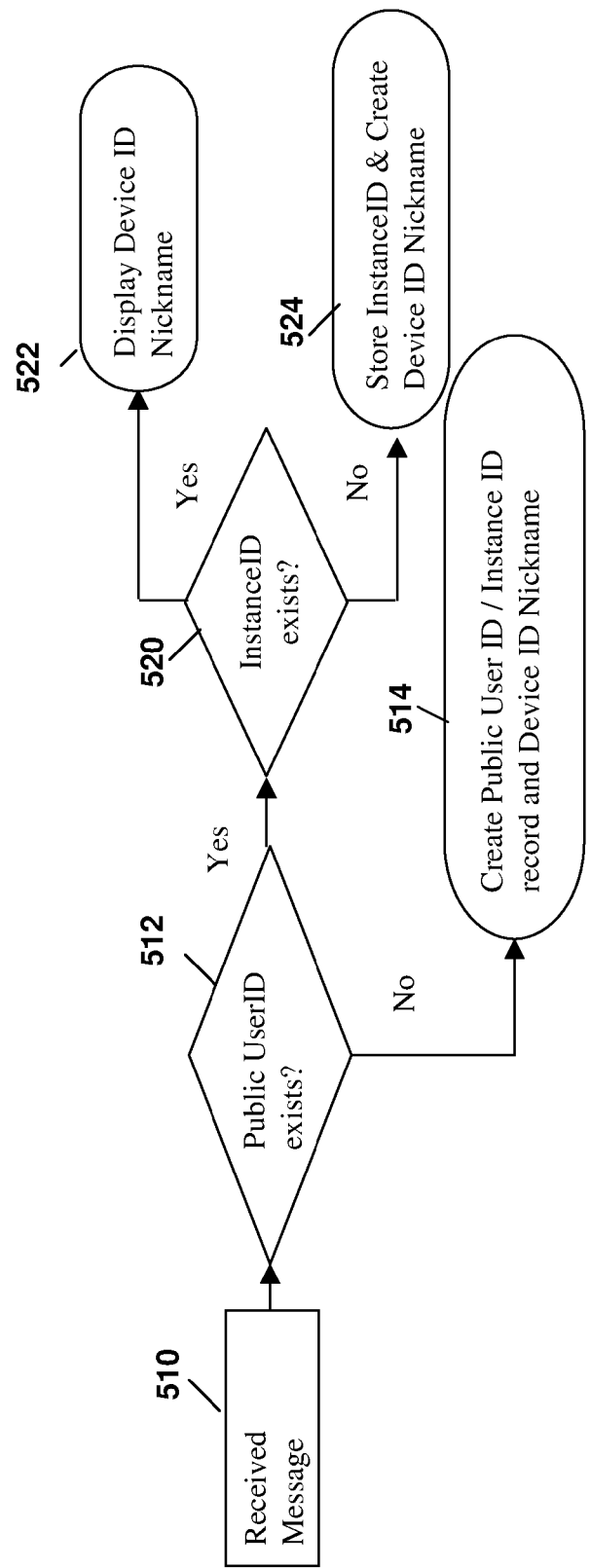
FIG. 5 is a flow diagram illustrating a method for linking a public user ID with an Instance_ID.

Referring to FIG. 5, the example of FIG. 5 is more specific than the generalization of FIG. 4. In FIG. 5, a message having a message type is received at block 510. The process then proceeds to block 512 in which a check is made to see whether a public user ID exists.

From block 512, if a public user ID does not exist, the process proceeds to block 514 in which a public user identifier, Instance_ID and device ID nickname are created.

Conversely, if from block 512 a public user ID does exist, the process proceeds to block 520. A check is made in block 520 to determine whether an Instance_ID exists for the received SIP message 510. If yes, the process proceeds to block 522 in which the device identifier nickname is displayed.

Conversely, if an instance identifier does not exist for block 520, the process proceeds to block 524 in which the instance identifier is stored and a nickname is created for the Instance_D.

Figure 6:
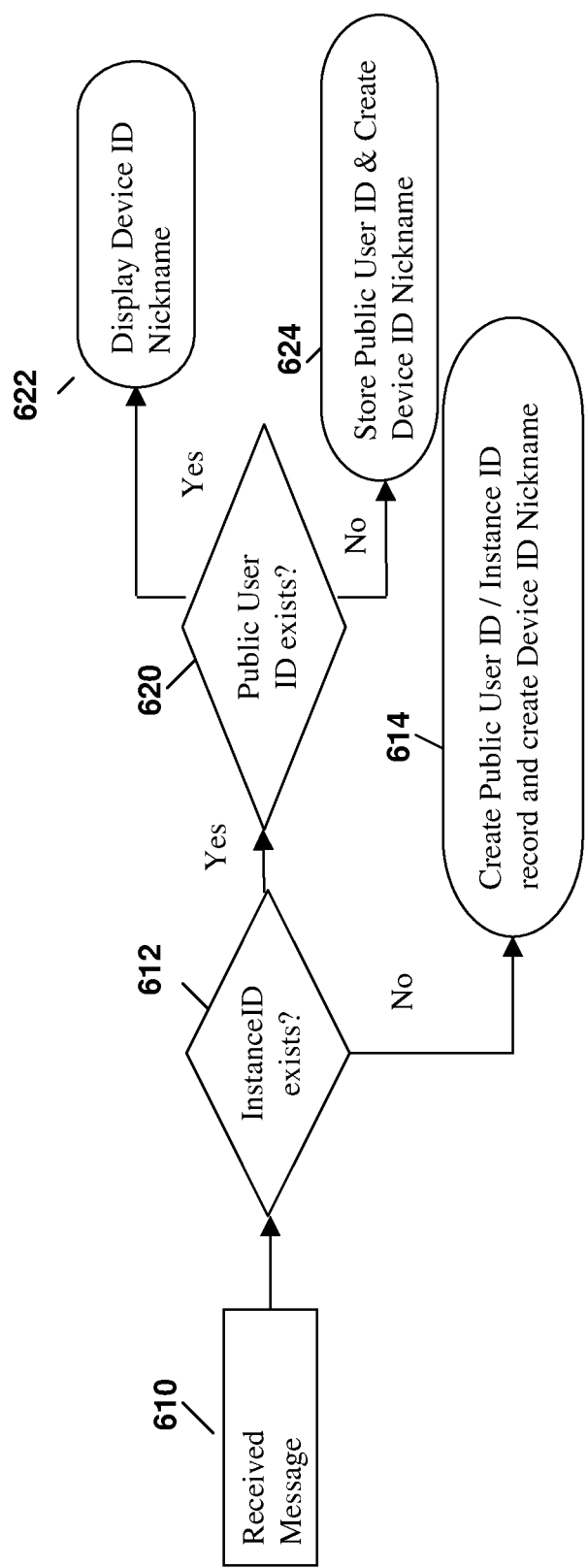
FIG. 6 is a flow diagram illustrating a method for linking an Instance-ID with a public user ID.

In a further embodiment, the root token could be the instance identifier. Reference is now made to FIG. 6.

Referring to FIG. 6, the process starts at block 610 in which a message having a message type is received. The process then proceeds to block 612 in which a check is made to see whether an Instance identifier exists. If not, the process proceeds to block 614 in which a public user identifier, Instance identifier record and device ID nickname are created.

Conversely, from block 612, if the process finds that an Instance identifier exists, the process then proceeds to block 620. In block 620 a check is made to see whether a public user identifier exists.

From block 620, if a public user identifier exists, the process proceeds to block 622 in which the device identifier nickname is displayed to the user. Conversely, if in block 620 the public user identifier does not exist, the process proceeds to block 624 in which a public user identifier is stored and a device identifier nickname is created.

Based on FIGS. 4, 5 and 6 above, if a message (e.g. SIP) is received which causes an indication such as a tone, visual indicator, vibration, combination thereof, to be provided to the user of the device, and the Instance_ID is present and stored against a public user ID on the device, the device ID nickname is displayed and or played and or sensory to the user.

Further, if the message arrives containing Instance_ID and this Instance_ID is already stored on the device, one of two things could happen. First, if a public user ID associated with a known Instance_ID is received in an incoming message matches another public user ID already stored on the device and the public user ID already has an associated device identifier nickname stored, then a visual, auditory or sensory indication is provided to the user of the device.

Alternatively, if the public user ID associated with a known Instance_ID received in an incoming message does not match an existing public user identifier on the device, then the public user identifier is stored in the location where the Instance identifier is stored. The public user identifier could use default values for properties or the user is prompted for public user ID properties in certain cases.

At the time of storage, the device ID nickname is also created against the Instance_ID. This device ID nickname is created via some input mechanism such as touch screen, keypad, stylus, track ball, roll wheel etc., or creating some random or default type of alpha-numeric or graphic picture nickname or combination that the user can edit at a later date.

In the implementation of FIG. 6, the Instance identifier could be the root element to which there are a number of public user identifiers and each public user identifier or group of public user identifiers has a nickname associated when the Instance_ID is used.

Figure 7:
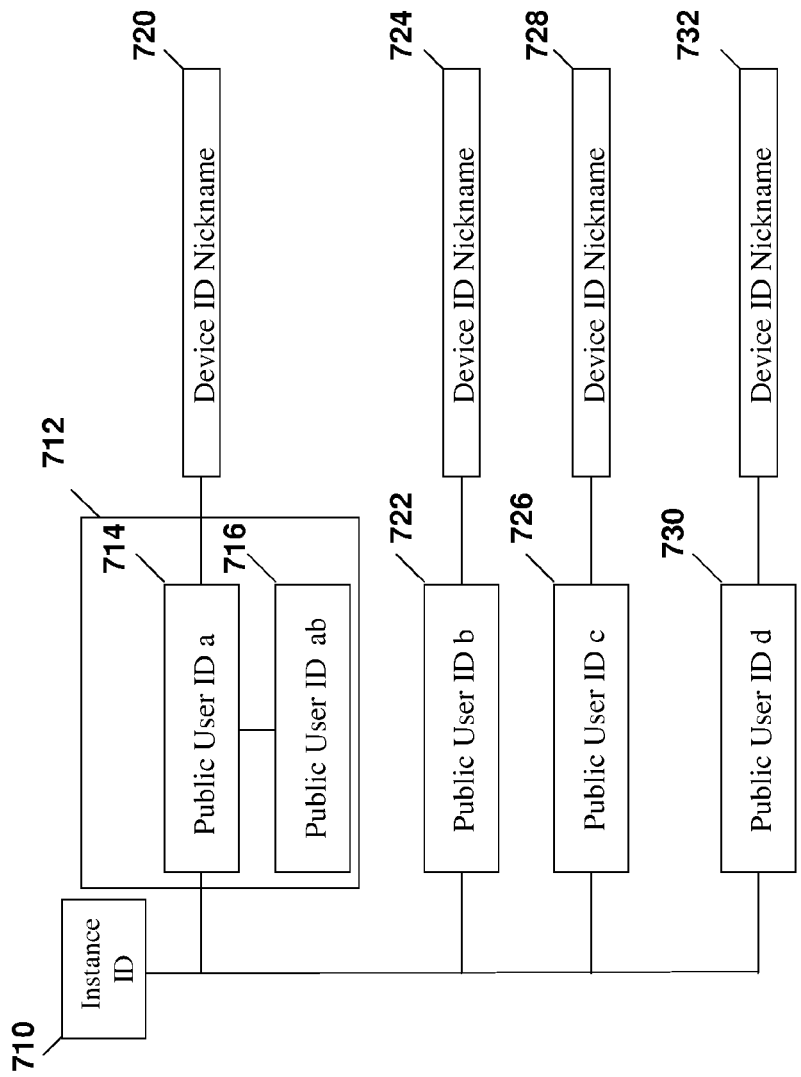
FIG. 7 is a block diagram of an exemplary data structure showing a relationship between an Instance-ID and various public user IDs and nicknames.

Reference is now made to FIG. 7. In FIG. 7, an Instance identifier 710 has a group of public user IDs 712, this group is associated with Instance identifier 710. Group 712 includes, in the example FIG. 7, a public user ID a 714 and a public user ID ab 716. The group 712 also has a device ID nickname 720 associated therewith.

Instance ID 710 further includes a public user ID 722 with a device ID nickname 724, a public user ID 726 associated with a device ID nickname 728 and a public user ID 730 associated with a device ID nickname 732.

As will be appreciated by those skilled in the art, the embodiments of FIGS. 1 to 7 allow a user to initiate contact with a specific device. In a further embodiment, devices have different capabilities. For instance, some phones support only OMA SIMPLE messaging, whereas others include video, some include voice and some include real time text.

Figure 8:
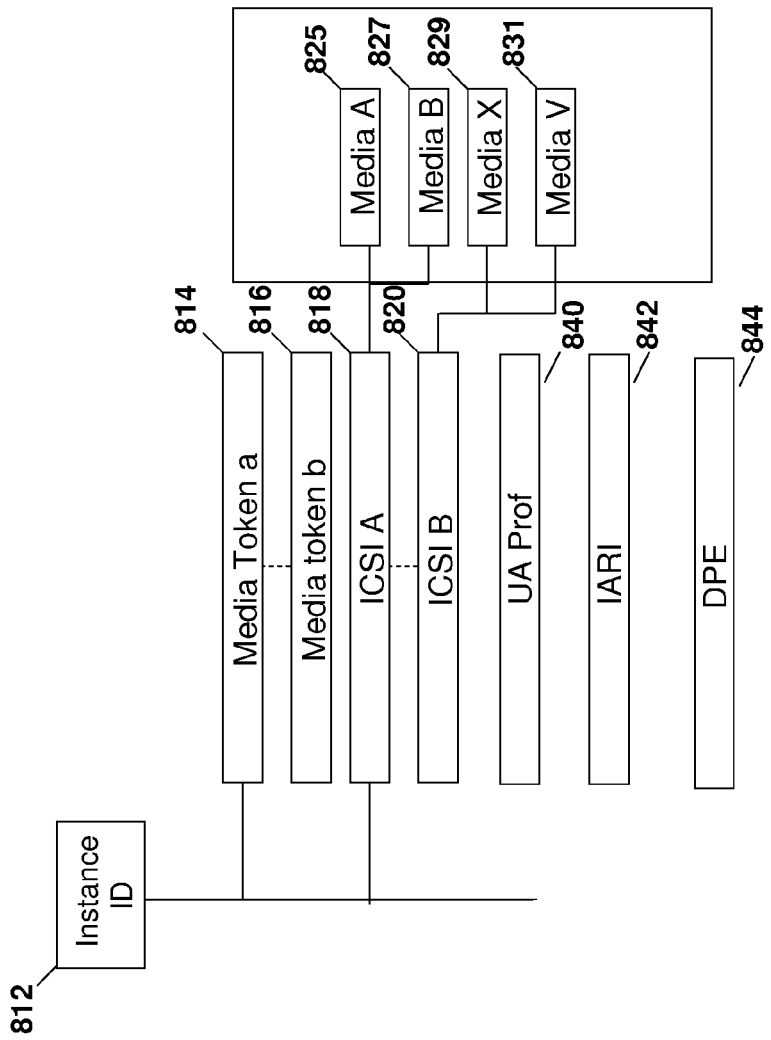
FIG. 8 is a block diagram of an exemplary data structure showing a relationship between an Instance-ID and media capabilities.

Reference is now made to FIG. 8. FIG. 8 shows an Instance identifier 812 against which are stored a list of capabilities that a device is known to support. These capabilities include either a media token such as "Media Token a" 814 or "Media token b" 816. Media tokens 814 or 816 define unique media such as "voice", "video" among others.

Conversely, an IMS communication service identifier (ICSI) 818 or ICSI 820 define a service or group of media tokens. As will be appreciated by those skilled in the art, the ICSI is defined in the third generation partnership project (3GPP) and provides a way of identifying an application or group of applications together.

From the example of FIG. 8, ICSI A 818 and ICSI B 820 include media associated therewith. Specifically, ICSI A 818 includes media A 825, and media B 827. Further, ICSI B 820 includes media X 829 and media V 831 associated thereto.

Further capabilities can be defined by a user agent profile (UAProf) 840, IMS Application Reference ID (IARI) 842 Device Profile Evolution (DPE) 844, among others. UAProf and DPE indicate device media capabilities, while ICSI and IARI indicate device service capabilities. As will be appreciated, the ICSI can be built on UAProf or DPE information. If the ICSI is stored in the network based common address book (CAB) the device may also be aware of a media that is supported by the ICSI from an internal mapping in its memory. If an ICSI is stored in the CAB that the device does not know, then the device does not support that service.

Additionally, the CAB can be used by other applications than IMS communications services. Such applications include but are not limited to social community services, advertisement services, among others. For such applications, making use of a CAB, an application service ID (ASI) can be created and stored in the CAB.

The various media can be displayed by graphical, alpha-numeric sensory or auditory representations to allow a user to understand what is supported. For example, if Yahoo™ has an ICSI value, a Yahoo icon or "Yahoo" could be shown in the CAB. This could be achieved by a URL or file locator. However, this is not meant to be limiting.

Figure 9:
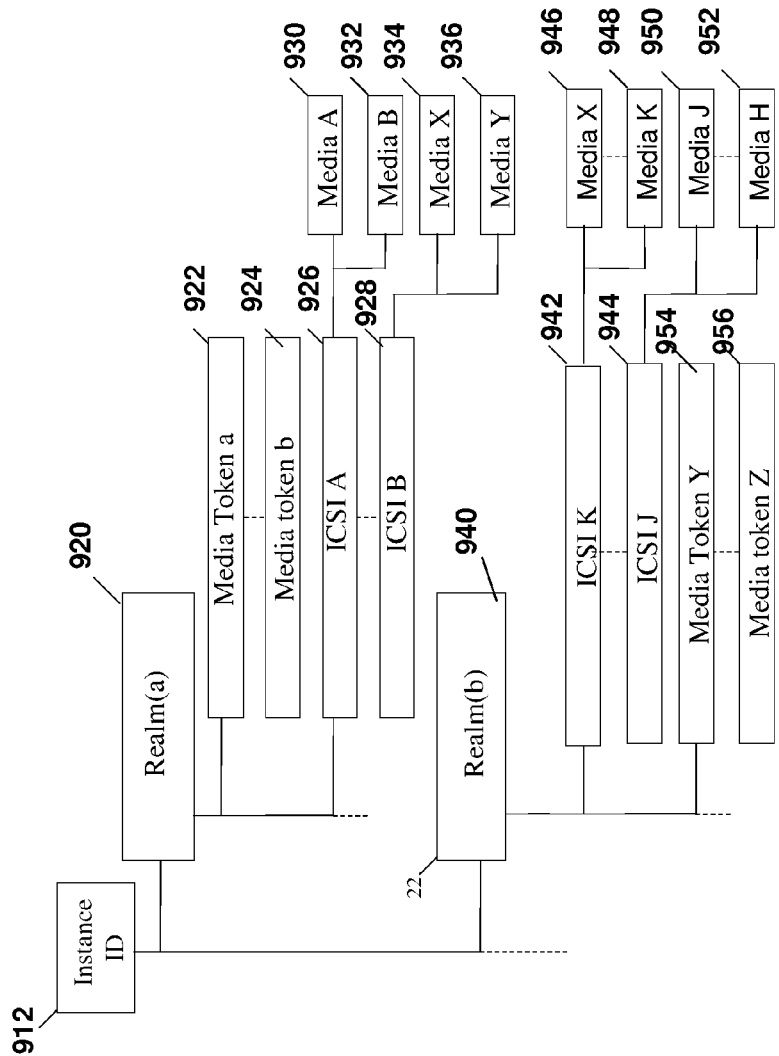
FIG. 9 is a block diagram of an exemplary data structure in which media capabilities are dependent upon a realm.

An alternative implementation is illustrated with respect to FIG. 9. In FIG. 9, an Instance_ID 912 includes a realm(a) 920 and a realm(b) 940. As used herein, realm is utilized as defined in IETF RFC 4282 or alternatively defined as a domain.

Under realm(a) 920, a media token a 922 and media token b 924 are presented. These are similar to the media tokens of FIG. 8.

Alternatively, ICSI A 926 and ICSI B 928 could be utilized. In further alternative embodiments, a UA profile, DSE, IARI or other means for identifying device capabilities could be utilized.

ICSI A 926 has media A 930 and media B 932 associated therewith.

ICSI B 928 has media X 934 and media V 936 associated thereto.

Similarly, a separate realm(b) 940 includes an ICSI K 942 and ISCI J 944. ICSI K 942 has media X 946 and media K 948 associated with it and media J 950 and media H 952 are associated with ICSI J 944.

Media token Y 954 and media token Z 956 could also be under realm(b) 940. The above is not meant to be exhaustive and other implementations under realm B would be known to those skilled in the art. Further, realm(b) 940 is not limited to having ICSI K, ICSI J, media token Y and media token Z and a subset of these could be under realm(b) 940.

As will be appreciated by those skilled in the art, realm(a) 920 could also be composed of multiple realms. For example, if a carrier has multiple domains but each should be mapped to realm(a) 920, realm(a) 920 could represent the multiple domains. An example is ATT is an operator who has domains: Pacbell, Bellsouth, ATT, Southwestern Bell, SBC etc When an Instance_ID is used by a specific operator, or in the case of realm, a device has specific media characteristics such as either individual types of media supported or IMS communications service ID which by definition define a service or group of media tokens. In one embodiment, only the ICSI is stored in the CAB the device may be aware of the media that is supported by that ICSI from an internal mapping in its memory or by retrieving and associating the UA PROF of DPE information.

Table Representation

As will be appreciated by those skilled in the art, as an alternative to the link illustrated in FIGS. 1 to 9, tables could be utilized to accomplish the connectivity described above. Reference is now made to Tables 1 to 6 below.

TABLE 1

| UserID | PublicUserID | ContactID | GUID |
|---|---|---|---|
| 1 | johnsmith@abc.com | 1 | |
| 2 | johnsmith@home.com | 1 | |
| 3 | joansmith@abc.com | 2 | |

Table 1 is user table. As illustrated in Table 1, three public user Ids are provided, each being assigned a unique user identifier. In Table 1, johnsmith@ abc.com is assigned user identifier 1 and contact identity 1.

User johnsmith@ home.com is identified with user ID 2 and contact ID 1.

User joansmith@ abc.com is defined by user identifier 3 and contact ID 2.

As will be appreciated, the user ID in this case is the root element but could also have names such as "contact entry", "contact view", "contact profile", among others, that identifies the public user ID and the reference (contact ID) to the contact details for that user identity. The contact ID will point to the user information table. This contains details to be stored in the address book such as the name, address, among others.

TABLE 2

User Information Table

| ContactID | First Name | Last Name | Home Address | Office Address | Other fields . . . |
|---|---|---|---|---|---|
| 1 | John | Smith | 123 Home St | 123 Office Blvd. | |
| 2 | Joan | Smith | 23 King St | 123 Tower Blvd. | |

Table 2 presents a user information table. In Table 2, contact ID is assigned a value. In the example of Table 2, the first name of contact ID 1 is John and the last name is Smith. The home address is 123 Home Street and the office address is 123 Office Boulevard.

Contact ID 2 has a first name of Joan and the last name is Smith. Contact ID 2 has a home address at 23 King Street and an office address at 123 Tower Boulevard.

A relationship table, entitled SyncUserConfig Table is provided to establish a synchronization between users and devices. In table 3, the user ID/device Instance is associated with other user IDs and device Instances.

TABLE 3

SyncUserConfig Table (Sync between users/devices)

| UserID/ Device (InstanceID) | To UserID/ Device (InstanceID) | Sync Properties | Policies | |
|---|---|---|---|---|
| 1/IMEI-1 | 1/IMEI-2 | 2-way | ? | John's cell device can sync with John's BB device. |
| 1/IMEI-1 | 3/IMEI-Joan | 1-way | ? | John's cell device can sync 1-way to Joan's device. |

In the first row of Table 3, the sync properties are two-way and policies are undefined in the table.

Similarly, user 1 with IMEI 1 is associated with user 3 IMEI-Joan as a one-way sync property and policies are yet undefined.

As will be appreciated, the root element will have against it Instance_IDs stored that are known to the user of the common address book.

TABLE 4

Device Table

| UserID | InstanceID | Nickname | GUID |
|---|---|---|---|
| 1 | IMEI-1 | John Cell | |
| 1 | IMEI-2 | John PDA | |
| 2 | IMEI-2 | John's Family | |
| 3 | IMEI-Joan | Joan's PDA | |

Referring to Table 4, one user ID has two IMEIs and separate nicknames for the IMEIs. Further, a user ID 2 has the same IMEI as John's PDA but the nickname instead refers to John's Family.

The third user ID 3 has an IMEI that is specified for a user and has a nickname associated therewith.

As will be appreciated by those in the art, multiple device IDs can be associated with a single user ID and similarly multiple user IDs can be associated to a single device ID.

In Table 5, various Instance_IDs are mapped to various media types and various realm IDs. These realm IDs are defined in Table 6 below.

TABLE 5

DeviceCap Table

| InstanceID | MediaType | RealmID |
|---|---|---|
| IMEI-1 | Voice | 3 |
| IMEI-2 | MP-3 | 1 |
| IMEI-2 | Video | 1 |
| IMEI-2 | Voice | 1 |
| IMEI-JOAN | Text | 2 |

Table 5 shows that IMEI-1 has voice capabilities; IMEI-2 has MP-3, video and voice capabilities and that IMEI-Joan has text capabilities. As will be appreciated, this is merely an example and various capabilities could be associated with various devices.

TABLE 6

Realm

| RealmID | Name |
|---|---|
| 1 | Rogers |
| 2 | ATT |
| 3 | Bell |

With regard to Table 6, as will be appreciated by those skilled in the art, device capabilities may be determined by the realm in which the device operates. Specifically certain carriers may limit what capabilities are provided by a device or may determine device capabilities for the realm. Thus a mobile device created by Company X and operating under realm 1 may have a predetermined set of capabilities that differs from the same mobile device operating under realm 2.

Figure 10:
FIG. 10 is a block diagram of an exemplary data structure showing a relationship between user identities, Instance-IDs, media capabilities and synchronization parameters.

Reference is now made to FIG. 10. FIG. 10 shows a linkage for Tables 1 to 6. In particular, the tree starts at base 1010 and has a user ID 1012 and a user ID 2 1040. User ID 1012 includes public user ID A 1014 which has addresses among other information 1016.

User ID 1012 further has an InstanceID A 1018 which includes nickname 1020 and media B 1022, media X 1024 or realm 1026.

Further, a list of synchronizations with various Instances are provided and shown as 1030. However, this is not meant to be limiting and multiple syncs with various Instance IDs would likely exist.

The user 1012 further has an InstanceID C 1032 that is synced with InstanceID A 1018. This sync is shown as reference numeral 1034.

Nickname 1035 is associated with Instance_ID C 1032 and Instance-ID C 1032 further has media B 1036 media X 1038 and realm 1039.

Regarding user ID 2 1040, under the tree is a public user ID C 1042 which has addresses and other information 1044. Further Instance_ID 1046 includes a nickname 1048 media B 1050 and media X 1052, and a realm 1054.

Utilizing the above, synchronization cases include:

1. Any contact information changes on device would get synced to CAB and reflected in 'User Information' table. Anybody registered to sync with johnsmith@ abc.com' would also get reflected on their device—'SyncUserConfig' table.

2. If 'johnsmith@abc.com' adds a new device, an ADD record would be sent to CAB and reflected in tables: 'Device', DeviceCap and 'Realm'. Again, users registered for syncing would get the update. Any device updates/deletes to device capabilities (media) would also get reflected within the tables.

3. A registered user can add other users who wish to share contact information.

4. When an incoming call happens, Public User ID and Instance_ID can be stored and synced to other users' contacts.

5. The sync properties/policies allow users to sync what type of information between users. Depending on the level of sync capabilities/policies, this can be quite complex.

6. An 'Active' flag may be added for syncing to indicate what device a user is currently logged into. This may be used for sharing the same device among different users.

RDF Schema

In a further alternative embodiment Resource Description Framework (RDF) Schema can be utilized. The Schema is defined as follows:

```
<?xml version="1.0"?>
<!DOCTYPE rdf:RDF [<!ENTITY xsd "http://www.w3.org/2001/XMLSchema#">]>
<rdf:RDF
   xmlns:rdf="http://www.w3.org/1999/02/22-rdf-syntax-ns#"
   xmlns:rdfs="http://www.w3.org/2000/01/rdf-schema#"
   xml:base="http://www.openmobilealliance.org/schemas/cab">
   <rdfs:Class rdf:ID="User"/>
   <rdfs:Class rdf:ID="UserInformation"/>
   <rdfs:Class rdf:ID="SyncUserConfig"/>
   <rdfs:Class rdf:ID="Device"/>
   <rdfs:Class rdf:ID="DeviceCap"/>
   <rdfs:Class rdf:ID="Realm"/>
   <!-- Class:User -->
   <rdf:Property rdf:ID="userID" rdfs:comment="An RDF property which defines a user as a URI.">
      <rdfs:domain rdf:resource="#User"/>
      <rdfs:range rdf:resource="&xsd;anyURI"/>
```

-continued

```
</rdf:Property>
<rdf:Property rdf:ID="userInfo" rdfs:comment="An RDF property which associates a User with a UserInformation.">
    <rdfs:domain rdf:resource="#User"/>
    <rdfs:range rdf:resource="#UserInformation"/>
</rdf:Property>
<!-- Class:UserInformation -->
<rdf:Property rdf:ID="firstName" rdfs:comment="An RDF property which defines the users first name.">
    <rdfs:domain rdf:resource="#UserInformation"/>
    <rdfs:range rdf:resource="&xsd;token"/>
</rdf:Property>
<rdf:Property rdf:ID="lastName" rdfs:comment="An RDF property which defines the users last name.">
    <rdfs:domain rdf:resource="#UserInformation"/>
    <rdfs:range rdf:resource="&xsd;token"/>
</rdf:Property>
<rdf:Property rdf:ID="homeAddress" rdfs:comment="An RDF property which defines the home address.">
    <rdfs:domain rdf:resource="#UserInformation"/>
    <rdfs:range rdf:resource="&xsd;token"/>
</rdf:Property>
<rdf:Property rdf:ID="officeAddress" rdfs:comment="An RDF property which defines the office address.">
    <rdfs:domain rdf:resource="#UserInformation"/>
    <rdfs:range rdf:resource="&xsd;token"/>
</rdf:Property>
<!-- Class:SyncUserConfig -->
<rdf:Property rdf:ID="deviceID " rdfs:comment="An RDF property which relates the 'device' to the given device itself.">
    <rdfs:domain rdf:resource="#SyncUserConfig"/>
    <rdfs:range rdf:resource="#Device"/>
</rdf:Property>
<rdf:Property rdf:ID="toDeviceID " rdfs:comment="An RDF property which relates the 'toDevice' to the given device itself.">
    <rdfs:domain rdf:resource="#SyncUserConfig"/>
    <rdfs:range rdf:resource="#Device"/>
</rdf:Property>
<rdf:Property rdf:ID="syncProperties" rdfs:comment="An RDF property which defines the sync-property.">
    <rdfs:domain rdf:resource="#SyncUserConfig"/>
    <rdfs:range rdf:resource="&xsd;token"/>
</rdf:Property>
<rdf:Property rdf:ID="policies" rdfs:comment="An RDF property which associates a given sync user config with policies.">
    <rdfs:domain rdf:resource="#SyncUserConfig"/>
    <rdfs:range rdf:resource="&xsd;anyURI"/>
</rdf:Property>
<!-- Class:Device -->
<rdf:Property rdf:ID="nickname" rdfs:comment="An RDF property which defines a device nickname.">
    <rdfs:domain rdf:resource="#Device"/>
    <rdfs:range rdf:resource="&xsd;token"/>
</rdf:Property>
<rdf:Property rdf:ID="userID" rdfs:comment="An RDF property associating a device with a User.">
    <rdfs:domain rdf:resource="#Device"/>
    <rdfs:range rdf:resource="#User"/>
</rdf:Property>
<rdf:Property rdf:ID="instanceID" rdfs:comment="An RDF property associating a device with 1 or more alternative IMEI's.">
    <rdfs:domain rdf:resource="#Device" />
    <rdfs:range rdf:resource="#DeviceCap" />
</rdf:Property>
<!-- Class:DeviceCap -->
<rdf:Property rdf:ID="mediaType" rdfs:comment="An RDF property which may have 1 or more items as media types.">
    <rdfs:range rdf:resource="&rdf;Alt"/>
</rdf:Property>
<rdf:Property rdf:ID="deviceCapRealm" rdfs:comment="An RDF property which defines the device capability realm.">
    <rdfs:domain rdf:resource="#DeviceCap"/>
    <rdfs:range rdf:resource="#Realm"/>
</rdf:Property>
<!-- Class:Realm -->
<rdf:Property rdf:ID="realmName"rdfs:comment="An RDF property which defines the realm name.">
```

```
    <rdfs:domain rdf:resource="#Realm"/>
    <rdfs:range rdf:resource="&xsd;token"/>
  </rdf:Property>
</rdf:RDF>
```

The above schema defines various classes. A first class is "User". User defines the properties of a User such as User ID.

A second class defined by the above schema is "Userinformation". Userinformation defines the properties of the User Information such as firstName, lastName, homeAddress, and officeAddress.

A third class defined by the above schema is "SyncUserConfig". SyncUserConfig defines the properties to accomplish synchronization between two users or device and include the todevice ID, from device ID, sync properties, and policy information.

A fourth class defined by the above schema is "Device". Device defines properties of the device including device nickname, Instance ID and the User ID.

A fifth class defined by the above schema is "Device Cap". Device Cap defines properties of the device capabilities including the supported media type and realm name or ID.

A sixth class defined by the above schema is "Realm". Realm defines properties of the Ream with Realm name.

As will be appreciated by those skilled in the art, the schema defined above has been established to follow the examples shown in Tables 1 to 6 above. The schema defined is not meant to be limiting, but is merely provided as an example.

Based on the above, an Instance of the RDF Schema could look like:

```
<?xml version="1.0"?>
<!DOCTYPE rdf:RDF [<!ENTITY xsd "http://www.w3.org/2001/XMLSchema#">]>
<rdf:RDF xmlns:rdf="http://www.w3.org/1999/02/22-rdf-syntax-ns#"
      xmlns:cab="http://www.openmobilealliance.org/schemas/cab#"
      xml:base="http://www.rim.com/cab/entries">
  <cab:User rdf:ID="johnsmithWork">
      <cab:userID rdf:datatype="&xsd;anyURI">johnsmith@abc.com</cab:userID>
      <cab:userInfo rdf:resource="#userInfo1"/>
  </cab:User>
  <cab:User rdf:ID="johnsmithHome">
      <cab:userID rdf:datatype="&xsd;anyURI">johnsmith@home.com</cab:userID>
      <cab:userInfo rdf:resource="#userInfo1"/>
  </cab:User>
  <cab:User rdf:ID="joansmith">
      <cab:userID rdf:datatype="&xsd;anyURI">joansmith@abc.com</cab:userID>
      <cab:userInfo rdf:resource="#userInfo2"/>
  </cab:User>
  <cab:UserInformation rdf:ID="userInfo1">
      <cab:firstName rdf:datatype="&xsd;token">John</cab:firstName>
      <cab:lastName rdf:datatype="&xsd;token">Smith</cab:lastName>
      <cab:homeAddress rdf:datatype="&xsd;token">123 Home St</cab:homeAddress>
      <cab:officeAddress rdf:datatype="&xsd;token">123 Office Blvd.</cab:officeAddress>
  </cab:UserInformation>
  <cab:Userinformation rdf:ID="userInfo2">
      <cab:firstName rdf:datatype="&xsd;token">Joan</cab:firstName>
      <cab:lastName rdf:datatype="&xsd;token">Smith</cab:lastName>
      <cab:homeAddress rdf:datatype="&xsd;token">23 King St</cab:homeAddress>
      <cab:officeAddress rdf:datatype="&xsd;token">123 Tower Blvd.</cab:officeAddress>
  </cab:UserInformation>
  <cab:SyncUserConfig rdf:ID="sync-user-config1">
     <cab:deviceID rdf:resource="#device-0405E83C3901"/>
     <cab:toDeviceID rdf:resource="#device-0305E82C3302"/>
       <cab:syncProperties rdf:datatype="&xsd;token">2-way</cab:syncProperties>
       <cab:policies
rdf:datatype="&xsd;anyURI">http://www.openmobilealliance.org/policies/cab/21740</cab:policies>
    </cab:SyncUserConfig>
    <cab:SyncUserConfig rdf:ID="sync-user-config2">
      <cab:deviceID rdf:resource="#device-0405E83C39017>
      <cab:toDeviceID rdf:resource="#device-0216100092747>
       <cab:syncProperties rdf:datatype="&xsd;token">1-way</cab:syncProperties>
       <cab:policies
rdf:datatype="&xsd;anyURI">http://www.openmobilealliance.org/policies/cab/21744</cab:policies>
    </cab:SyncUserConfig>
    <cab:Device rdf:ID="device-0405E83C3901">
       <cab:nickname rdf:datatype="&xsd;token">John Cell</cab:nickname>
       <cab:userID rdf:resource="#johnsmithWork"/>
       <cab:instanceID rdf:resource="#imei-1"/>
    </cab:Device>
    <cab:Device rdf:ID="device-0305E82C3302">
       <cab:nickname rdf:datatype="&xsd;token">John PDA</cab:nickname>
       <cab:userID rdf:resource="#johnsmithWork"/>
       <cab:instanceID rdf:resource="#imei-2"/>
    </cab:Device>
```

```
<cab:Device rdf:ID="device-0305F8100019">
    <cab:nickname rdf:datatype="&xsd;token">John's Family</cab:nickname>
    <cab:userID rdf:resource="#johnsmithHome"/>
    <cab:instanceID rdf:resource="#imei-27>
</cab:Device>
<cab:Device rdf:ID="device-021610009274">
    <cab:nickname rdf:datatype="&xsd;token">Joan's PDA</cab:nickname>
    <cab:userID rdf:resource="#joansmith"/>
    <cab:instanceID rdf:resource="#imei-joan"/>
</cab: Device>
<cab:DeviceCap rdf:ID="imei-1">
    <cab:mediaType>
     <rdf:Alt>
        <rdf:li rdf:resource="#Voice"/>
     </rdf:Alt>
    </cab:mediaType>
    <cab:deviceCapRealm rdf:resource="#realm-3"/>
</cab:DeviceCap>
<cab:DeviceCap rdf:ID="imei-2">
    <cab:mediaType>
      <rdf:Alt>
        <rdf:li rdf:resource="#MP-3"/>
        <rdf:li rdf:resource="#Video"/>
        <rdf:li rdf:resource="#Voice"/>
      </rdf:Alt>
    </cab:mediaType>
    <cab:deviceCapRealm rdf:resource="#realm-1"/>
</cab:DeviceCap>
<cab:DeviceCap rdf:ID="imei-joan">
    <cab:mediaType>
      <rdf:Alt>
        <rdf:li rdf:resource="#Text"/>
      </rdf:Alt>
    </cab:mediaType>
    <cab:deviceCapRealm rdf:resource="#realm-2"/>
</cab:DeviceCap>
<cab:Realm rdf:ID="realm-1">
    <cab:realmName rdf:datatype="&xsd;token">Rogers</cab:realmName>
</cab:Realm>
<cab:Realm rdf:ID="realm-2">
    <cab:realmName rdf:datatype="&xsd;token">ATT</cab:realmName>
</cab:Realm>
<cab:Realm rdf:ID="realm-3">
    <cab:realmName rdf:datatype="&xsd;token">Bell</cab:realmName>
</cab:Realm>
</rdf:RDF>
```

The above RDF Schema Instance is an example of the real RDF content which is generated based on the RDF Schema. In particular, the instance provides for a reference ID of johnsmithWork giving a URI ofjohnsmith@ abc.com and a reference ID of johnsmithHome giving a URI ofjohnsmith@ home.com. Similar information for the user ID includes first name, last name, home address and work address.

The above instance also provides for synchronization capabilities between devices and assigns nicknames to Instance_IDs.

The above instance also provides for realm definitions and for media capabilities of devices.

As will be appreciated, the above is only an example of an instance of the RDF schema and is not meant to be limiting.

VCard

The above could also be implemented using versitcards (VCards). As will be appreciated by those skilled in the art, a vCard is a real time card used in a common address book to update information and show availability. A VCard example is shown below.

```
BEGIN:VCARD
VERSION:3.0
FN:John Smith
TEL;WORK: +1-111-111-1111
TEL;HOME: +1-222-222-2222
TEL;CELL:+1-333-333-3333
URL: http://www.example.org/johnsmith
EMAIL;INTERNET:johnsmith@home.com
END:VCARD
```

The above VCard does not contain enough information to store the parameters that defined in the present disclosure. In order to overcome this, extensions could be added, which include:

1. Instance ID—the instance ID describes the unique ID of the user's specific contact device. The ID can be either of the following TYPE: IMEI, MAC PIN, ESN address.

2. Device ID Nickname—a device ID nickname is the identifier that is convenient to the user of device storing the instance ID and shall be mapped to the instance ID. The value is either of TYPE; NAME which is an alpha numeric string or URI that points to a media object for e.g. and image or video content.

3. Device Capabilities—Device capabilities stores the capabilities of the user's contact device. It is represented using an URI pointing to, for example, a UAPROF or an alpha-numeric string.

4. Contact Properties—status of a contact, i.e., category or properties of the user, such as 'family', 'friends', 'co-worker', 'sensitive', 'home', 'office', and/or realm or operator name serving the user such as 'AT&T', 'Verizon', etc.

A VCard using the above would look like:

---

```
BEGIN:VCARD
VERSION:3.0
FN:John Smith
INSTANCE ID; IMEI:aaaaaa; MAC:bbbbbb
DEVICE ID NICKNAME; URI: http://www.example.org/nickname.jpg;
NAME: abc123
DEVICE CAPABILITIES; URI:http://www.example.org/uaprof/device-
A.xml;
    URI:http://www.example.org/uaprof/deviceB.xml;
CONTACT PROPERTIES; CATEGORY:home;; OPERATOR: AT&T;
```

-continued

```
TEL;HOME: +1-222-222-2222
TEL;CELL:+1-333-333-3333
URL: http://www.example.org/johnsmith
EMAIL;INTERNET:johnsmith@home.com
END:VCARD
```

---

The use of contact properties could, in some embodiments, provide the user with an ability to distinguish relationships. For example, address book entries may represent family members, friends, neighbours, sports club members, co-workers, operator name serving the user or others. A user of a common address book may wish to use such properties to their advantage. For example, a holiday greeting could be sent to all "friends" or the relationship could be used by other applications to warn the user to double check spelling and content when sending communications to "sensitive communication partners". In a further embodiment, a user may wish to contact a user based on the service provider or operator serving the receiving user to minimize the cost of communication (for e.g. communication between users who belong to the same service provider is lower than otherwise).

XML Schema

The above could also be defined utilizing XML schema. An example of an XML schema is:

```
<?xml version="1.0"encoding="UTF-8"?>
<xs:schema
    targetNamespace="urn:oma:cabs:xml:ns:instance-identifier"
    xmlns:id="urn:oma:cabs:xml:ns:instance-identifier"
    xmlns:xs="http://www.w3.org/2001/XMLSchema"
    elementFormDefault="qualified" attributeFormDefault="unqualified">
    <!-- /instanceID -->
    <xs:element name="instanceID">
        <xs:complexType>
            <xs:sequence>
                <xs:element name="realm"type=" id:realmType" minOccurs="0"
maxOccurs="unbounded"/>
                <xs:group ref="id:capGroup"/>
            </xs:sequence>
            <xs:attribute name="id" type="xs:anyURI"/>
        </xs:complexType>
    </xs:element>
    <!-- /instanceID/realm -->
    <xs:complexType name="realmType">
        <xs:sequence>
            <xs:group ref="id:capGroup"/>
        </xs:sequence>
        <xs:attribute name="id" type="xs:string"/>
    </xs:complexType>
    <!-- capGroup -->
    <xs:group name="capGroup">
        <xs:sequence>
            <xs:element name="csi" type="id:csiType" minOccurs="0" maxOccurs="unbounded"/>
            <xs:element name="ari" type="id:ariType" minOccurs="0" maxOccurs="unbounded"/>
            <xs:element name="mediaToken" type="xs:string" minOccurs="0"
maxOccurs="unbounded"/> <!-- e.g. application/3gpp-ims+xml;sv="1,2" or UA capabilities and
characteristics per RFC 3840 or along the lines of the Internet-Draft draft-ietf-sipping-media-policy-
dataset-05 Internet-Draft draft-ietf-sipping-media-policy-dataset-05 documents a format for the media
properties of Session Initiation Protocol (SIP) sessions. Examples for such media properties are the
codecs or media types used in a session Internet-Draft draft-ietf-sipping-media-policy-dataset-05 -->
        </xs:sequence>
    </xs:group>
    <!-- //instanceID/csi or //realm/csi -->
    <xs:simpleType name="csiType">
        <xs:restriction base="xs:anyURI"/>
    </xs:simpleType>
    <!-- //instanceID/rai or //realm/rai -->
    <xs:simpleType name="ariType">
        <xs:restriction base="xs:anyURI"/>
    </xs:simpleType>
</xs:schema>
```

Figure 11:
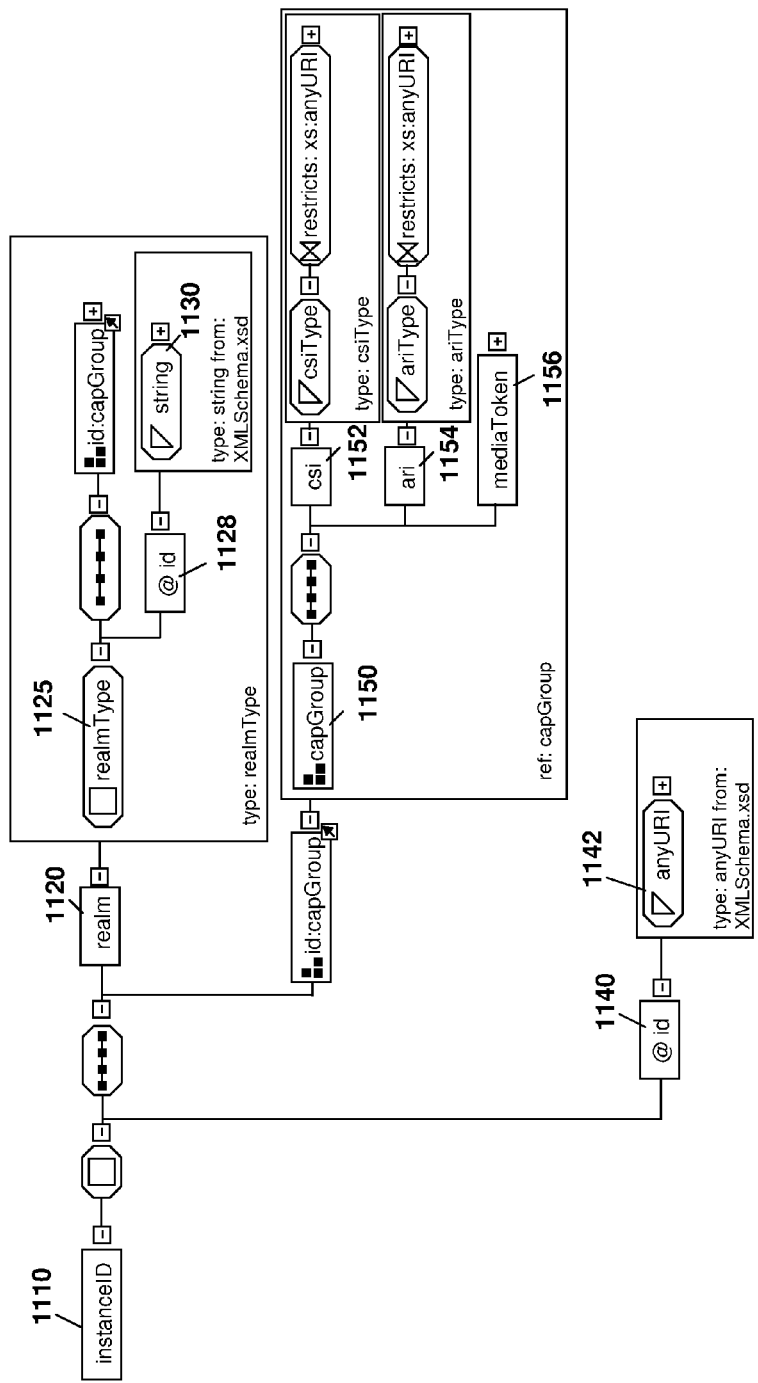
FIG. 11 is a block diagram showing an exemplary XML schema apt to be used with the present systems and methods.

The above XML schema could also be represented graphically as is shown by FIG. 11. Referring to FIG. 11 an instance identifier 1110 can include various realms 1120, the realms 1120 having realm types 1125 and having identifiers 1128 with strings 1130 utilized for nicknames.

Instance_ID 1110 further can include any identifier directly as is shown by identifier 1140 which has a URI 1142 associated therewith.

Instance_ID 1110 can further include a capGroup 1150 which includes a CSI 1152 an ARI 1154 and media tokens 1156. A capGroup, as will be appreciated by those skilled in the art, is a structure containing a related elements media token, (I)CSI, (I)ARI. As used herein, CSI and ARI are generalizations of an ICSI and IARI, which are not IMS dependent.

The grouping of the three elements for the capGroup is found once in FIG. 9, elements 922 to 928, and once in FIG. 8, elements 814 to 842.

The modified vCard, or a contact card using the XML or RDF schemas as described in the disclosure ensure the parameters can be shared and provide a device with a relationship between a public user identity and a device. The term contact card is used herein to collectively indicate a vCard or a data structure with the modified XML or RDF schemas described herein.

The above therefore provides for, in an address book, the addition of an instance identifier to a public user identifier to allow a user to contact a specific device. Further, nicknames can be added to instance identifiers in order to facilitate user selection of the particular device. In some embodiments, the instance identifier could also be identified with media or other device capabilities to allow a user or a device to intelligently select which device to connect to.

The above can be implemented on any device whether fixed or mobile. If the above is implemented on a mobile device, an exemplary mobile device apt to be used with the present systems and methods is described below with reference to FIG. 12.

Mobile device 1200 is preferably a two-way wireless communication device having at least voice and data communication capabilities. Mobile device 1200 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1200 is enabled for two-way communication, it will incorporate a communication subsystem 1211, including both a receiver 1212 and a transmitter 1214, as well as associated components such as one or more, preferably embedded or internal, antenna elements 1216 and 1218, local oscillators (LOs) 1213, and a processing module such as a digital signal processor (DSP) 1220. As will be apparent to those skilled in the field of communications, the particular design of the communication subsystem 1211 will be dependent upon the communication network in which the device is intended to operate.

Network access requirements will also vary depending upon the type of network 1219. In some CDMA networks network access is associated with a subscriber or user of mobile device 1200. A CDMA mobile device may require a removable user identity module (RUIM) or a subscriber identity module (SIM) card in order to operate on a CDMA network. The SIM/RUIM interface 1244 is normally similar to a card-slot into which a SIM/RUIM card can be inserted and ejected like a diskette or PCMCIA card. The SIM/RUIM card can have approximately 94 K of memory and hold many key configuration 1251, and other information 1253 such as identification, and subscriber related information.

Figure 12:
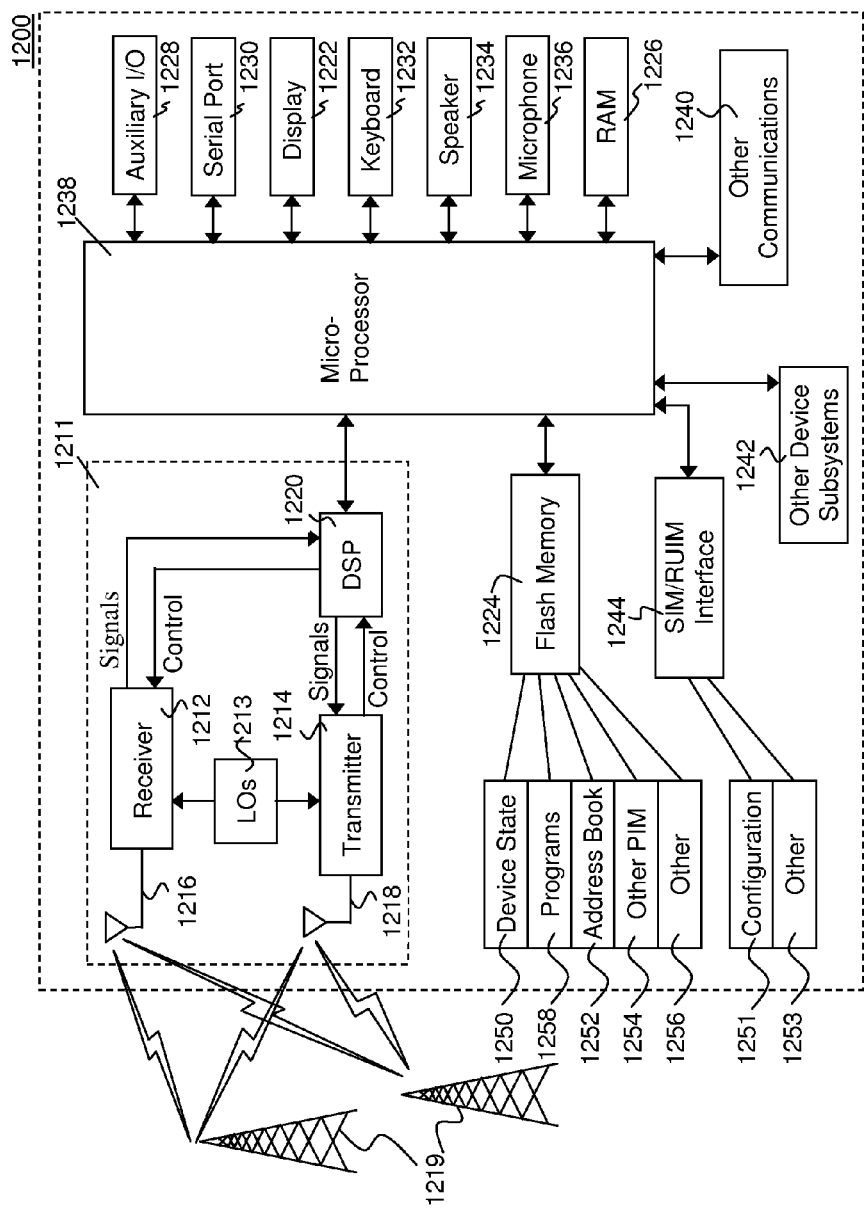
FIG. 12 is a block diagram showing an exemplary mobile device apt to be used with the present systems and methods.

When required network registration or activation procedures have been completed, mobile device 1200 may send and receive communication signals over the network 1219. As illustrated in FIG. 12, network 1219 can consist of multiple base stations communicating with the mobile device. For example, in a hybrid CDMA 1x EVDO system, a CDMA base station and an EVDO base station communicate with the mobile station and the mobile device is connected to both simultaneously. The EVDO and CDMA 1x base stations use different paging slots to communicate with the mobile device.

Signals received by antenna 1216 through communication network 1219 are input to receiver 1212, which may perform such common receiver functions as signal amplification, frequency down conversion, filtering, channel selection and the like, and in the example system shown in FIG. 12, analog to digital (A/D) conversion. A/D conversion of a received signal allows more complex communication functions such as demodulation and decoding to be performed in the DSP 1220. In a similar manner, signals to be transmitted are processed, including modulation and encoding for example, by DSP 1220 and input to transmitter 1214 for digital to analog conversion, frequency up conversion, filtering, amplification and transmission over the communication network 1219 via antenna 1218. DSP 1220 not only processes communication signals, but also provides for receiver and transmitter control. For example, the gains applied to communication signals in receiver 1212 and transmitter 1214 may be adaptively controlled through automatic gain control algorithms implemented in DSP 1220.

Mobile device 1200 preferably includes a microprocessor 1238 which controls the overall operation of the device. Communication functions, including at least data and voice communications, are performed through communication subsystem 1211. Microprocessor 1238 also interacts with further device subsystems such as the display 1222, flash memory 1224, random access memory (RAM) 1226, auxiliary input/output (I/O) subsystems 1228, serial port 1230, one or more keyboards or keypads 1232, speaker 1234, microphone 1236, other communication subsystem 1240 such as a short-range communications subsystem and any other device subsystems generally designated as 1242. Serial port 1230 could include a USB port or other port known to those in the art.

Some of the subsystems shown in FIG. 12 perform communication-related functions, whereas other subsystems may provide "resident" or on-device functions. Notably, some subsystems, such as keyboard 1232 and display 1222, for example, may be used for both communication-related functions, such as entering a text message for transmission over a communication network, and device-resident functions such as a calculator or task list.

Operating system software used by the microprocessor 1238 is preferably stored in a persistent store such as flash memory 1224, which may instead be a read-only memory (ROM) or similar storage element (not shown). Those skilled in the art will appreciate that the operating system, specific device applications, or parts thereof, may be temporarily loaded into a volatile memory such as RAM 1226. Received communication signals may also be stored in RAM 1226.

As shown, flash memory 1224 can be segregated into different areas for both computer programs 1258 and program data storage 1250, 1252, 1254 and 1256. These different storage types indicate that each program can allocate a portion of flash memory 1224 for their own data storage requirements. Microprocessor 1238, in addition to its operating system functions, preferably enables execution of software applications on the mobile device. A predetermined set of applications that control basic operations, including at least data and voice communication applications for example, will normally be installed on mobile device 1200 during manufacturing. Other applications could be installed subsequently or dynamically.

A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 1219. In a preferred embodiment, the PIM data items are seamlessly integrated, synchronized and updated, via the wireless network 1219, with the mobile device user's corresponding data items stored or associated with a host computer system. Further applications may also be loaded onto the mobile device 1200 through the network 1219, an auxiliary I/O subsystem 1228, serial port 1230, short-range communications subsystem 1240 or any other suitable subsystem 1242, and installed by a user in the RAM 1226 or preferably a non-volatile store (not shown) for execution by the microprocessor 1238. Such flexibility in application installation increases the functionality of the device and may provide enhanced on-device functions, communication-related functions, or both. For example, secure communication applications may enable electronic commerce functions and other such financial transactions to be performed using the mobile device 1200.

In a data communication mode, a received signal such as a text message or web page download will be processed by the communication subsystem 1211 and input to the microprocessor 1238, which preferably further processes the received signal for output to the display 1222, or alternatively to an auxiliary I/O device 1228.

A user of mobile device 1200 may also compose data items such as email messages for example, using the keyboard 1232, which is preferably a complete alphanumeric keyboard or telephone-type keypad, in conjunction with the display 1222 and possibly an auxiliary I/O device 1228. Such composed items may then be transmitted over a communication network through the communication subsystem 1211.

For voice communications, overall operation of mobile device 1200 is similar, except that received signals would preferably be output to a speaker 1234 and signals for transmission would be generated by a microphone 1236. Alternative voice or audio I/O subsystems, such as a voice message recording subsystem, may also be implemented on mobile device 1200. Although voice or audio signal output is preferably accomplished primarily through the speaker 1234, display 1222 may also be used to provide an indication of the identity of a calling party, the duration of a voice call, or other voice call related information for example.

Serial port 1230 in FIG. 12, would normally be implemented in a personal digital assistant (PDA)-type mobile device for which synchronization with a user's desktop computer (not shown) may be desirable, but is an optional device component. Such a port 1230 would enable a user to set preferences through an external device or software application and would extend the capabilities of mobile device 1200 by providing for information or software downloads to mobile device 1200 other than through a wireless communication network. The alternate download path may for example be used to load an encryption key onto the device through a direct and thus reliable and trusted connection to thereby enable secure device communication. As will be appreciated by those skilled in the art, serial port 1230 can further be used to connect the mobile device to a computer to act as a modem.

Other communications subsystems 1240, such as a short-range communications subsystem, is a further optional component which may provide for communication between mobile device 1200 and different systems or devices, which need not necessarily be similar devices. For example, the subsystem 1240 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for storing device data for a device in an address book stored in a memory, the method comprising:
   using a processor operably coupled with a communications subsystem and the memory, performing:
   receiving an electronic message from the device comprising a public user identity of a user and an instance identifier for the device;
   determining that the public user identity exists within the address book and the instance identifier does not exist within the address book; and
   responsive to the determining, performing:
   storing the instance identifier in the address book in association with the public user identity, wherein the instance identifier in combination with the public user identity uniquely identifies the device;
   assigning a device identifier nickname representing a relationship between the public user identity and the device;
   storing in the address book the device identifier nickname in a device identifier nickname field associated with the instance identifier;
   storing in the address book device capabilities of the device in a device capabilities field associated with the instance identifier;
   receiving a user selection from a user interface associated with the address book, the user selection identifying the device identifier nickname; and
   initiating a communication with the device based on the user selection.

2. The method of claim 1, wherein the public user identity is selected from the group consisting of a session initiation protocol uniform resource identifier, a telephone uniform resource identifier; and a mobile systems international subscriber identity number.

3. The method of claim 1, wherein the device identifier nickname is at least one of alphanumeric text, a graphic, a picture, a sound, a link to alphanumeric text, a link to a graphic, a link to a picture, and a link to a sound.

4. The method of claim 1, wherein storing the device capabilities further comprises adding contact properties.

5. The method of claim 1, wherein the storing in the address book device capabilities of the device in the device capabilities field associated with the instance identifier further comprises associating tokens identifying device capabilities against the instance identifier.

6. The method of claim 5, wherein the tokens identifying device capabilities include one or a plurality of tokens selected from the group of:
   a media token;
   an instant messaging service communication service identifier;

a user agent profile;
an instant messaging service application reference identifier; and
a device profile evolution.

7. The method of claim 1, wherein storing the device capabilities further comprises storing a realm in which the unique device is operating.

8. The method of claim 1, wherein the address book is a network based address book.

9. The method of claim 1, wherein the message has a message type selected from the group consisting of:
a session initiation protocol message;
an email message, and
a hypertext transfer protocol message.

10. A computing device adapted for storing device data for a device in an address book stored in a memory, the computing device comprising:
a communications subsystem configured to receive an electronic message from the device comprising a public user identity of a user and an instance identifier for the device; and
a processor operably coupled with the communications subsystem and the memory, wherein the processor is configured to:
determine that the public user identity exists within the address book and the instance identifier does not exist within the address book;
when it is determined that the public user identity exists within the address book and the instance identifier does not exist within the address book:
store the instance identifier in the address book in association with the public user identity, wherein the instance identifier in combination with the public user identity uniquely identifies the device;
assign a device identifier nickname representing a relationship between the public user identity and the device;
store in the address book the device identifier nickname in a device identifier nickname field associated with the instance identifier;
store in the address book device capabilities of the device in a device capabilities field associated with the instance identifier
receive a user selection from a user interface associated with the address book, the user selection identifying the device identifier nickname; and
initiate a communication with the device based on the user selection.

11. The computing device of claim 10, wherein the device identifier nickname is at least one of alphanumeric text, a graphic, a picture, a sound, a link to alphanumeric text, a link to a graphic, a link to a picture, and a link to a sound.

12. The computing device of claim 11, wherein the processor is further configured to store the device capabilities as tokens identifying device capabilities against the instance identifier.

13. The computing device of claim 12, wherein the tokens identifying device capabilities include one or a plurality of tokens selected from the group of:
a media token;
an instant messaging service communication service identifier;
a user agent profile,
an instant messaging service application reference identifier; and
a device profile evolution.

14. The computing device of claim 10, wherein the message has a message type selected from the group consisting of: a session initiation protocol message; an email message, and a hypertext transfer protocol message.

15. A non-transitory computer readable medium storing a computer program product, which when executed by a processor of a computing device is configured to:
receive an electronic message from the device comprising a public user identity of a user and an instance identifier for a device;
determine that the public user identity exists within an address book stored in a memory of the device and the instance identifier does not exist within the address book;
when it is determined that the public user identity exists within the address book and the instance identifier does not exist within the address book:
store the instance identifier in the address book in association with the public user identity, wherein the instance identifier in combination with the public user identity uniquely identifies the device;
assign a device identifier nickname representing a relationship between the public user identity and the device;
store in the address book the device identifier nickname in a device identifier nickname field associated with the instance identifier;
store in the address book device capabilities of the device in a device capabilities field associated with the instance identifier;
receive a user selection from a user interface associated with the address book, the user selection identifying the device identifier nickname; and
initiate a communication with the device based on the user selection.

* * * * *